W. D. FORSYTH.
FORGED CAR TRUCK SIDE FRAME.
APPLICATION FILED JUNE 23, 1913.
1,083,393.
Patented Jan. 6, 1914.
3 SHEETS—SHEET 1.
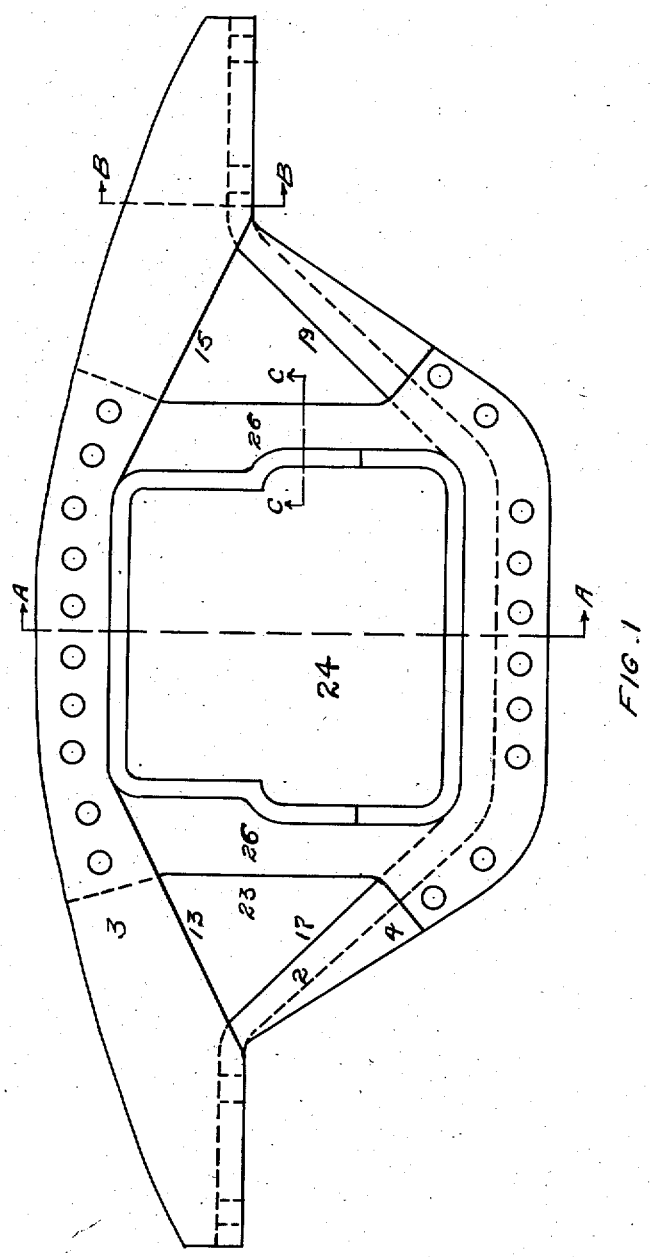
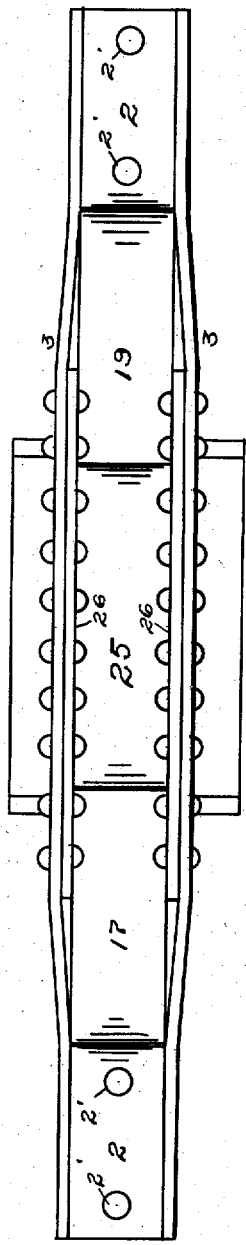
WITNESSES
INVENTOR
William D. Forsyth
by A. M. Neeper
attorney

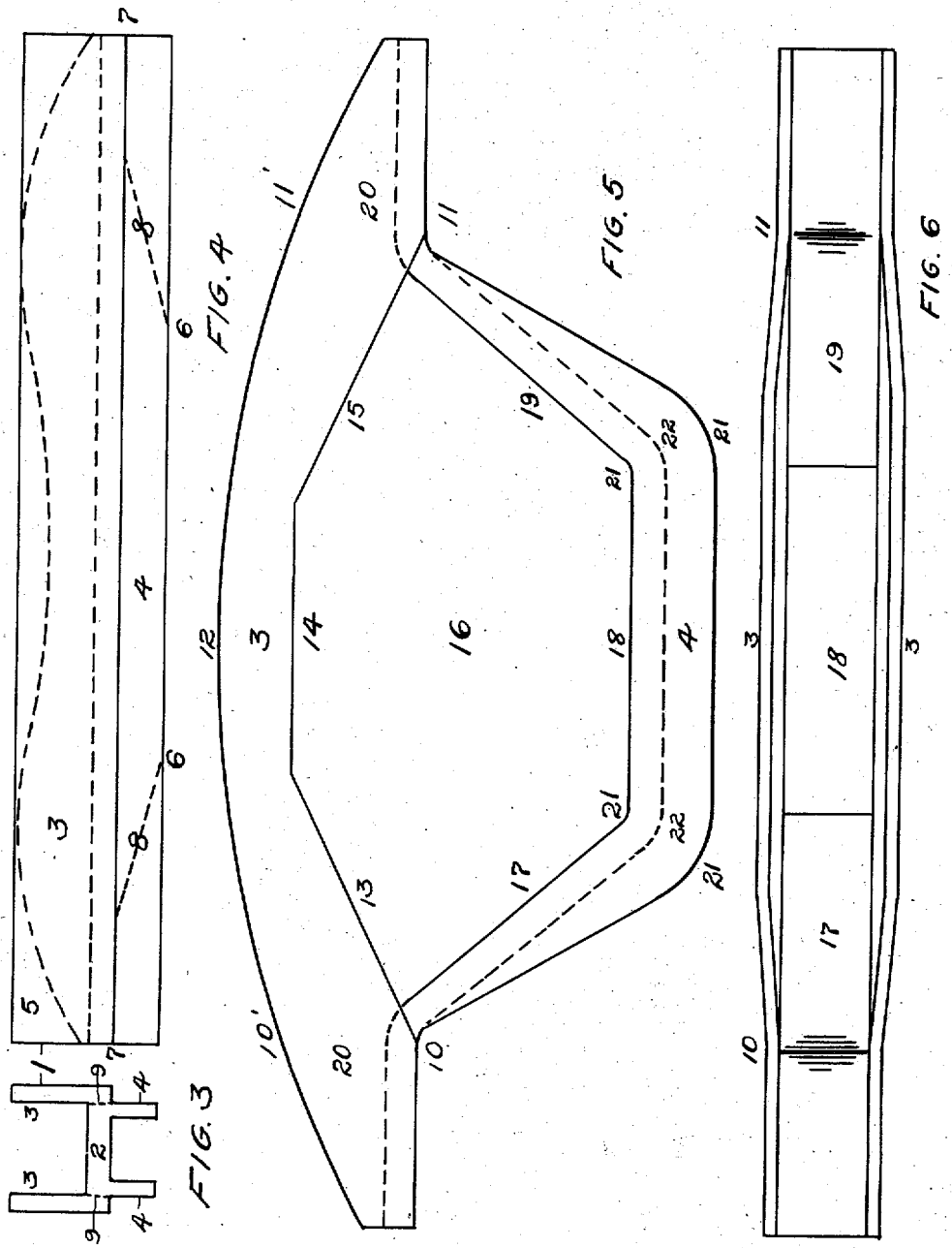

W. D. FORSYTH.
FORGED CAR TRUCK SIDE FRAME.
APPLICATION FILED JUNE 23, 1913.
1,083,393.
Patented Jan. 6, 1914.
3 SHEETS—SHEET 3.
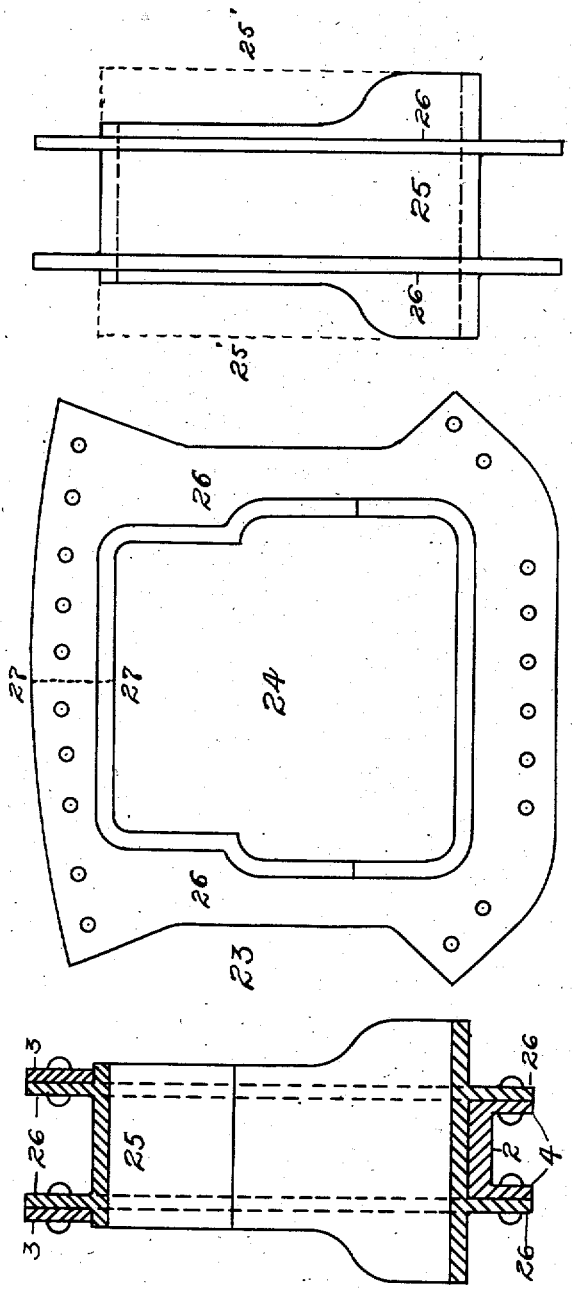
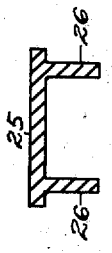
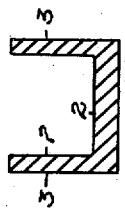
WITNESSES
INVENTOR
William D. Forsyth
by A. M. Keeper
Attorney

UNITED STATES PATENT OFFICE.

WILLIAM D. FORSYTH, OF YOUNGSTOWN, OHIO, ASSIGNOR, BY MESNE ASSIGNMENTS, TO RAILWAY PRODUCTS CORPORATION, OF BUFFALO, NEW YORK, A CORPORATION OF NEW YORK.

FORGED CAR-TRUCK SIDE FRAME.

1,083,393.   Specification of Letters Patent.   Patented Jan. 6, 1914.

Application filed June 23, 1913. Serial No. 775,217. REISSUED

*To all whom it may concern:*

Be it known that I, WILLIAM D. FORSYTH, a citizen of the United States, residing at Youngstown, in the county of Mahoning and State of Ohio, have invented new and useful Improvements in Forged Car-Truck Side Frames, of which the following is a specification.

My invention relates to forged car truck side frames.

The principal object of my invention is to provide a car truck side frame made from two simple structural shapes of rolled, forged or pressed metal.

My invention consists of a car truck side frame made from two structural shapes, each a single piece of rolled, forged or pressed metal, the first comprising a compression member and a tension member integral with each other; the second a truss member so shaped as to provide a bolster opening and to be attached to the first; the distribution of metal in all of the members of the frame and their parts is one of the novel and essential features of my invention.

In the accompanying drawings, Figure 1 is a side view of the car truck side frame; Fig. 2 is a top plan view of Fig. 1; Fig. 3 is an end view of the structural shape from which the frame is made; Fig. 4 is a side view of said shape, with dotted lines showing where the same is sheared and a horizontal line indicating the top surface of the web of said shape; Fig. 5 is a side view of said shape, slitted, bent and expanded; Fig. 6 is a top plan view of Fig. 5; Fig. 7 is a section of Fig. 1 on line A—A; Fig. 8 is a section of Fig. 1 on line B—B; Fig. 9 is a section of Fig. 1 on line C—C; Fig. 10 is a side view of the truss member of the frame; Fig. 11 is an end view of Fig. 10.

Like figures of reference refer to like parts throughout.

In Figs. 3 and 4, 1 is a structural metal shape having a web 2; flanges 3, 3, and wings 4, 4. The flanges 3, 3, are at the outer edges of the web 2 and extend therefrom substantially at right angles. Wings 4, 4, extend substantially at right angles to the web in a direction opposite to flanges 3, 3, and are inset from the edges so that their outer surfaces are substantially in the same plane as the inner surfaces of flanges 3, 3. Flanges 3, 3, are sheared along undulating line 5. Wings 4 are sheared between points 6 and 7, along dotted line 8, and the underside of flanges 3, 3. The web 2 is slitted by two parallel slits substantially along dotted lines 9, 9, Fig. 3, said slits extending from point 10 to point 11, Fig. 5; that is to say, the web 2 is divided into three sections, consisting of two ends comprising that part of the web 2, having journal box bolt holes 2', between points 10 and 11 and the respective ends of said web, and that portion of the web between points 10 and 11, Figs. 5 and 6.

When the structural shape 1 has been slitted, as hereinbefore described by suitable apparatus, the flanges 3, 3, are bent and formed by pressing or forging so as to have the curves 12, 12, along their outer edges and so that their inner edges shall be substantially in lines 13, 14 and 15 of the hexagonal opening 16 of the frame, and the web and its wings are so formed and stretched by suitable operations and apparatus as to take the shape shown in Fig. 5; the outside edges of the wings 4, 4, now constituting the V-shaped flanges of the web and the top surfaces of the web having substantially the lines 17, 18 and 19 lying in the remaining three sides of the hexagonal opening 16.

The compression member of the frame is constituted of the flanges 3, 3, bent so as to have the curves 12, 12, and the sides 13, 14 and 15. The tension member of the frame is constituted by that portion of the web between points 10 and 11, with its top side being substantially on the lines 17, 18 and 19, and said wings 4, 4, now constitute the flanges of the tension member, being of the shape shown in side view in Fig. 5. It will be noted that the greatest depth of metal vertically in the compression member is between points 10—10' and 11—11', along the dotted lines 20, and that the greatest depth of metal in the tension member is between points 21—21, along dotted lines 22. The ends of the frame are those portions thereof as are between point 10 and the end of 1, at one end thereof, and point 11 and the other end of 1.

In Figs. 10, 23 is the truss member of the frame. This member is preferably made out of a structural shape shown in solid lines and dotted lines 25', in Fig. 11; said structural shape forming truss member 23 has a web 25 and two flanges 26, 26, intermediate the edges of said web, which are parallel to each other. Web 25 is sheared so as to have the shape shown in Figs. 1, 7, 10 and 11, and so that its flanges 26 may be inserted between the flanges of the compression member 3, 3, as shown at the top of Fig. 7, and be inside said flanges so that the web and flanges of the tension member will be included within said flanges 26, 26, as shown at the bottom of Fig. 7. The bolster opening 24 is formed in said truss member so as to be wider at the bottom than at the top. When said truss member has been inserted inside of said flanges 3, 3, and the tension member of the frame has been inserted within its flanges 26, 26, it is riveted in this position in a suitable way.

It will be noted that the web 25 of the truss member bridges for the length of the flange of the truss member, the space between flanges 3, 3, forming the compression member of the frame and reinforces the web of the tension member at the bottom of the frame. The truss member may be welded at line 27—27, or the ends thereof may be butted together at said line.

What I claim as my invention is:

1. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape.

2. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof.

3. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, and means of attaching the truss member thereto.

4. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, and means of attaching the truss member thereto.

5. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, and means of attaching the truss member to the inner sides of the flanges of the compression member and to the outer sides of the flanges of the tension member.

6. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, and means of attaching the truss member to the inner sides of the flanges of the compression member and to the outer sides of the flanges of the tension member.

7. A car-truck side frame made from a rolled, forged or pressed metal structural shape, comprising a web having flanges at its edges on one side and wings intermediate its edges on the other side, said shape being slitted longitudinally intermediate its said flanges and being sheared and bent so that the outer edges shall be curves and their inner edges shall form three sides of the hexagonal opening in said frame; said wings being sheared at their ends and with said web being bent and stretched so that their inner edges and the top of said web shall form the three remaining sides of said hexagonal opening, and so that the ends of said structural shape shall extend at each end of said frame beyond said compression and tension members.

8. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, and a truss member centrally attached to said compression and tension members.

9. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, a truss member centrally attached to said compression and tension members, and means at each end of said frame for attaching journal boxes thereto.

10. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, and a truss member centrally attached to said compression and tension members.

11. A car truck side frame made from a single piece of rolled, forged or pressed metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so that said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, a truss member centrally attached to said compression and tension members, and means at each end of said frame for attaching journal boxes thereto.

12. A car truck side frame made from a structural shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in direction at right angles to the plane of said web to form an opening in said frame for the reception of a truss member and ends for the attachment of journal boxes.

13. A car truck side frame made from a structural metal shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in direction at right angles to the plane of said web to form an opening in said frame for the reception of a truss member and ends for the attachment of journal boxes and a truss member attached to the flanges forming the sides of said opening.

14. A car truck side frame made from a structural metal shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in direction at right angles to the plane of said web to form an opening in said frame for the reception of a truss member and ends for the attachment of journal boxes and a truss member attached to the flanges forming the sides of said opening and means to attach journal boxes at each end of said frame.

15. A car truck side frame made from a structural metal shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in direction at right angles to the plane of said web to form an opening in said frame for the reception of a truss member and ends for the attachment of journal boxes; and a truss member attached at its flanges to the inside of the flanges of the compression member and the outside of the flanges of the tension member.

16. A car truck side frame made from a structural metal shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in direction at right angles to the plane of said web to form an opening in said frame for the reception of a truss member and ends for the attachment of journal boxes; a truss member attached to its flanges to the inside of the flanges of the compression member and the outside of the flanges of the tension member and means at each end of said frame for the attachment of journal boxes.

17. A car truck side frame made from a structural metal shape 1, slitted intermediate its ends and formed to have ends comprising parts of flanges 3 and part of web 2; a compression member comprising flanges 3 and part of web 2; a tension member comprising part of web 2 and sheared wings 4.

18. A car truck side frame made from a structural metal shape 1, slitted intermediate its ends and formed to have ends comprising parts of flanges 3 and part of web 2; a compression member comprising flanges 3 and part of web 2; a tension member comprising part of web 2 and sheared wings 4 and a truss member 23.

19. A car truck side frame made from a structural metal shape 1, slitted intermediate its ends and formed to have ends comprising parts of flanges 3 and part of web 2; a compression member comprising flanges 3 and part of web 2; a tension member comprising part of web 2 and sheared wings 4, a truss member 23, and means at each end of said frame for the attachment of journal boxes thereto.

20. A car truck side frame made from a structural metal shape 1, slitted intermediate its ends and formed to have ends comprising parts of flanges 3 and part of web 2; a compression member comprising flanges 3 and part of web 2; a tension member comprising part of web 2 and sheared wings 4; said compression and tension members being expanded in direction at right angles to said web to form a hexagonal opening in said frame; a truss member 23, mounted in said opening and affixed to the inside of the flanges of the compression member and to the outside of the flanges of the tension member, and means at each end of said frame for the attachment of journal boxes thereto.

21. A car truck side frame made from a single piece of metal, comprising a web having flanges at its edges, and wings intermediate its edges extending from said web in direction opposite to the direction of said flanges, the compression member of said frame consisting of the ends of said web and the flanges thereof; the tension member thereof consisting of the remainder of said web and its wings, said members being formed so as to provide a bolster opening in said frame.

In witness whereof I have hereunto subscribed my name in the presence of two subscribing witnesses.

WILLIAM D. FORSYTH.

Witnesses:
M. E. THOMAS,
A. M. NEEPER.